March 5, 1935. T. E. STARK 1,993,689
TOOL FOR PREPARING MEAT
Filed Feb. 21, 1934
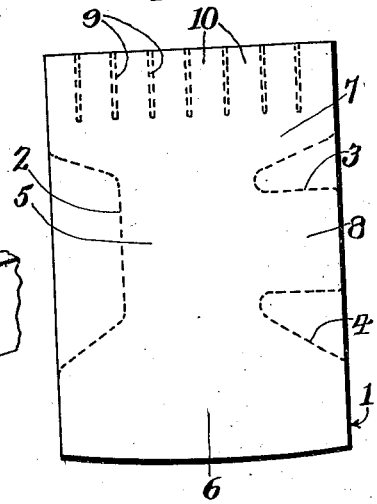
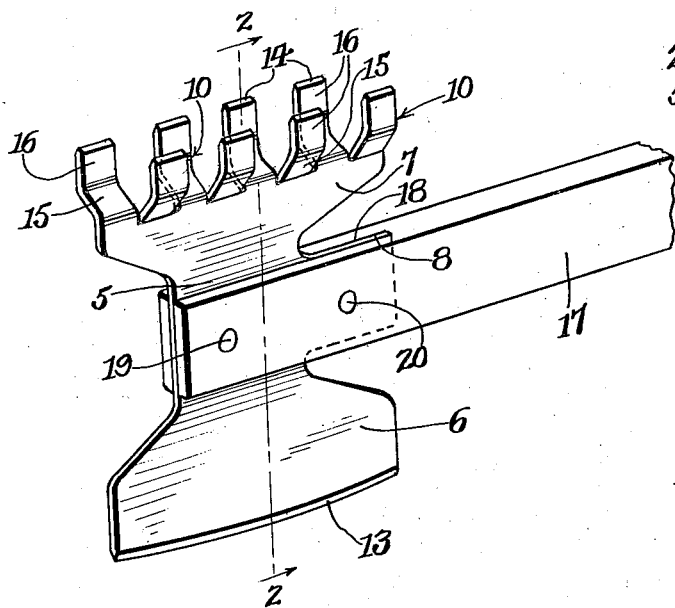
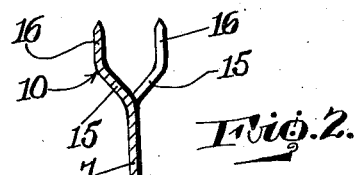
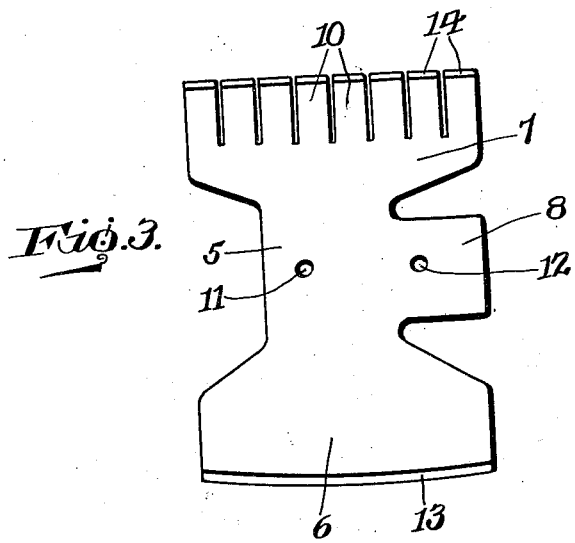
Inventor
Truman Elias Stark
By Geo. P. Kimmel
Attorney Patented Mar. 5, 1935

1,993,689

UNITED STATES PATENT OFFICE 1,993,689

TOOL FOR PREPARING MEAT

Truman Elias Stark, Urbana, Ind., assignor to The Cyclone Seeder Company, Urbana, Ind.

Application February 21, 1934, Serial No. 712,415

5 Claims. (Cl. 17—31)

This invention relates in general to tools, and more particularly has reference to a tool for use in preparing meat or the like and to a blank for the same.

It is an object of this invention to provide a blank for a tool of the character set forth, which blank may be cut out from a flat sheet of metal in a relatively inexpensive manner.

It is a further object that this blank shall be of such a nature that it may be firmly and rigidly attached to a handle, and that it shall have two oppositely disposed operative portions so formed as to be capable of being used as a meat tenderer and a meat cleaver respectively.

It is a further object that the portion adapted to be used as a meat tenderer shall have parts spaced laterally in opposite directions from the plane of the main portion of the blank so that the meat tenderer may be made to cover a relatively wide range or surface while at the same time being formed from a single sheet of metal.

Another object of this invention is to provide a tool including a head having an intermediate portion formed to receive a handle and an edge portion adapted to serve as a meat tenderer. One other object of this invention is to provide a tool having an intermediate portion adapted to receive a handle and an edge portion providing a cleaver.

With the above and other objects in view, this invention is set forth by way of illustration in the accompanying drawing and following description.

In the drawing:

Figure 1 is a perspective view illustrating a tool constructed in accordance with this invention.

Figure 2 is a sectional view taken along the line 2—2 of Figure 1.

Figure 3 is a side elevation of the blank for the tool illustrated in Figure 1.

Figure 4 is a view illustrating the manner in which the blank shown in Figure 3 is formed from a sheet of metal.

With reference first to Figure 4 of the drawing, the single sheet of metal generally indicated by the numeral 1 is cut out along the dotted line 2 and along the dotted lines 3 and 4 to provide a reduced intermediate portion 5 and a pair of end portions 6 and 7 of relatively greater width than said intermediate portion. Between the dotted lines 3 and 4 there is also provided a laterally extending portion 8 on the reduced intermediate portion 5. One of the relatively wide end portions 7 is provided with a series of parallel spaced slits indicated by the dotted line 9, thus dividing the outer edge of this end portion into a series of separated parts 10.

In Figure 3 of the drawing is illustrated the blank after it has been cut out. The reduced intermediate portion 5 serves to connect the relatively wide end portions 6 and 7 respectively and also serves to carry the laterally extending portion 8. The portions 5 and 8 are provided with perforations 11 and 12 and are adapted to receive a handle for the tool in a manner which will be presently set forth. The outer edge 13 of the end portion 6 is provided with a continuous sharp outer surface and is adapted when placed in the finished tool to serve as a meat cleaver. The separated parts 10 on the relatively wide end portions 7 are each sharpened at their outer extremity 14. As illustrated in Figures 1 and 2, these parts 10 are then struck out and away from the plane of the remainder of the blank, alternate parts being struck out in opposite directions. Thus there are formed from each part 10 a laterally extending stretch 15 and a stretch 16 which is parallel to but in offset relation with respect to the central plane of the major portion of the blank. This end portion of the tool thus provides a meat tenderer which will cover a relatively wide area even though it is formed from a single sheet of metal.

The handle 17 for the tool being described may be formed of wood or of any other suitable material and is provided with a bifurcated portion 18 extending inward from one end thereof a distance equal to the width of the intermediate portion 5 plus the length of the laterally extending portion 8. This bifurcated portion is so formed as to just fit over the portions 5 and 8 of the blank previously described and to snugly engage the opposite faces of the same. After they have been placed in this position, the handle 17 is secured in place on the blank by means of rivets 19 and 20 or similar securing means passing through the opposed portions of the handle and through the openings 11 and 12 respectively in the blank. The handle is thus firmly secured in place and the assemblage provides a tool which is simple, inexpensive to manufacture, and efficient in operation.

It will be seen from the above that a tool has been described together with a blank therefor, the structures of which carry out all of the objects and advantages sought by this invention. It is to be understood that the same is by way of illustration and is not to be taken as a limitation of the scope of this invention. The scope of this invention is to be limited only by the prior art and by the terms of the appended claims.

What I claim is:—

1. A combined meat tenderer and cleaver head comprising a one-piece body of metallic material having a central portion and a pair of end portions, said central portion being of less width than and having its side edges inset with respect to the side edges of said end portions, one of said end portions having its end edge sharp and continuous, the other of said end portions having its end edge sharp, the said other end portion being formed with lengthwise extending spaced slits terminating at its outer end and with integral alternately offset parts terminating in the outer end edge thereof, said parts forming the outer end edge of the said other end portion into a pair of rows of endwise aligning spaced stretches disposed on opposite sides of the plane of said body, the stretches of one row being alternately disposed with respect to the stretches of the other row.

2. A combined meat tenderer and cleaver head comprising a one-piece body of metallic material having a central portion and a pair of end portions, said central portion being of less width than and having its side edges inset with respect to the side edges of said end portions, one of said end portions having its end edge sharp and continuous, the other of said end portions having its end edge sharp, the said other end portion being formed with lengthwise extending spaced slits terminating at its outer end and with integral alternately offset parts terminating in the outer end edge thereof, said parts forming the outer end edge of the said other end portion into a pair of rows of endwise aligning spaced stretches disposed on opposite sides of the plane of said body, the stretches of one row being alternately disposed with respect to the stretches of the other row, said continuous outer end edge being curved, and each of said parts including an outwardly directed inner inclined stretch and an outer stretch disposed parallel to one face of said body.

3. A combined meat tenderer and cleaver head comprising a one-piece body of metallic material having a central portion and a pair of end portions, said central portion being of less width than and having its side edges inset with respect to the side edges of said end portions, one of said end portions having its end edge sharp and continuous, the other of said end portions having its end edge sharp, the said other end portion being formed with lengthwise extending spaced slits terminating at its outer end and with integral alternately offset parts terminating in the outer end edge thereof, said parts forming the outer end edge of the said other end portion into a pair of rows of endwise aligning spaced stretches disposed on opposite sides of the plane of said body, the stretches of one row being alternately disposed with respect to the stretches of the other row, an extension projecting laterally from one side edge of said central portion, spaced from said end portions and formed with an opening, and said central portion being formed with an opening aligning with and spaced from the opening in said extension.

4. A combined meat tenderer and cleaver head comprising a one-piece body of metallic material having a central portion and a pair of end portions, said central portion being of less width than and having its side edges inset with respect to the side edges of said end portions, one of said end portions having its end edge sharp and continuous, the other of said end portions having its end edge sharp, the said other end portion being formed with lengthwise extending spaced slits terminating at its outer end and with integral alternately offset parts terminating in the outer end edge thereof, said parts forming the outer end edge of the said other end portion into a pair of rows of endwise aligning spaced stretches disposed on opposite sides of the plane of said body, the stretches of one row being alternately disposed with respect to the stretches of the other row, a rectangular extension projecting laterally from one side edge of said central portion, spaced from and having its outer end aligning with a side edge of said end portions, said central portion being formed with an opening between the lengthwise median of said body and the other side edge thereof, and said extension being formed with an opening between its transverse median and that side edge of the central portion from which it projects.

5. In a combined meat tenderer and cleaver, a one-piece body of metallic material constituting a head and formed of a central portion and a pair of end portions, said central portion being of less width than and having its side edges inset with respect to the side edges of said end portions, one of said end portions having a sharp end edge continuous from one side edge to the other side edge thereof, the other of said end portions having a sharp end edge formed of a pair of offset rows of spaced endwise aligning stretches disposed on opposite sides of the plane of said body, the stretches of one row being alternately disposed with respect to the stretches of the other row, a rectangular extension projecting laterally from one side edge of said central portion, spaced from and having its outer end flush with a side edge of said end portions, and a handle having a bifurcated end part positioned against opposite sides of said central portion and opposite sides of said extension, flush with the other side edge of said central portion, abutting the outer end of said extension and anchored directly to the latter and directly to said central portion, the width of said handle corresponding to that of said extension.

TRUMAN ELIAS STARK.